April 10, 1928.
R. B. BAGBY
1,665,835
POWER TRANSMITTING MECHANISM
Filed Oct. 5, 1922
2 Sheets-Sheet 2
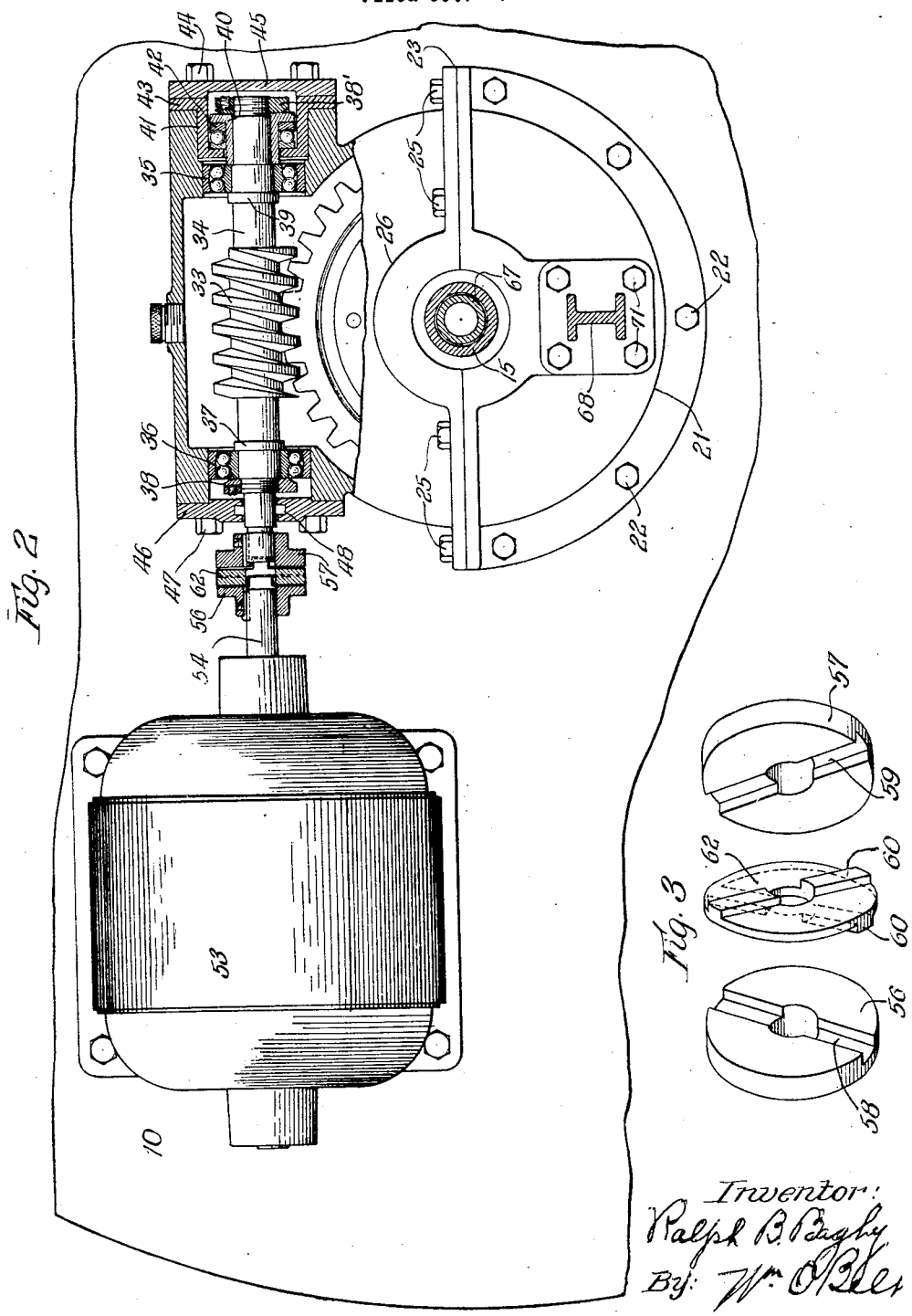

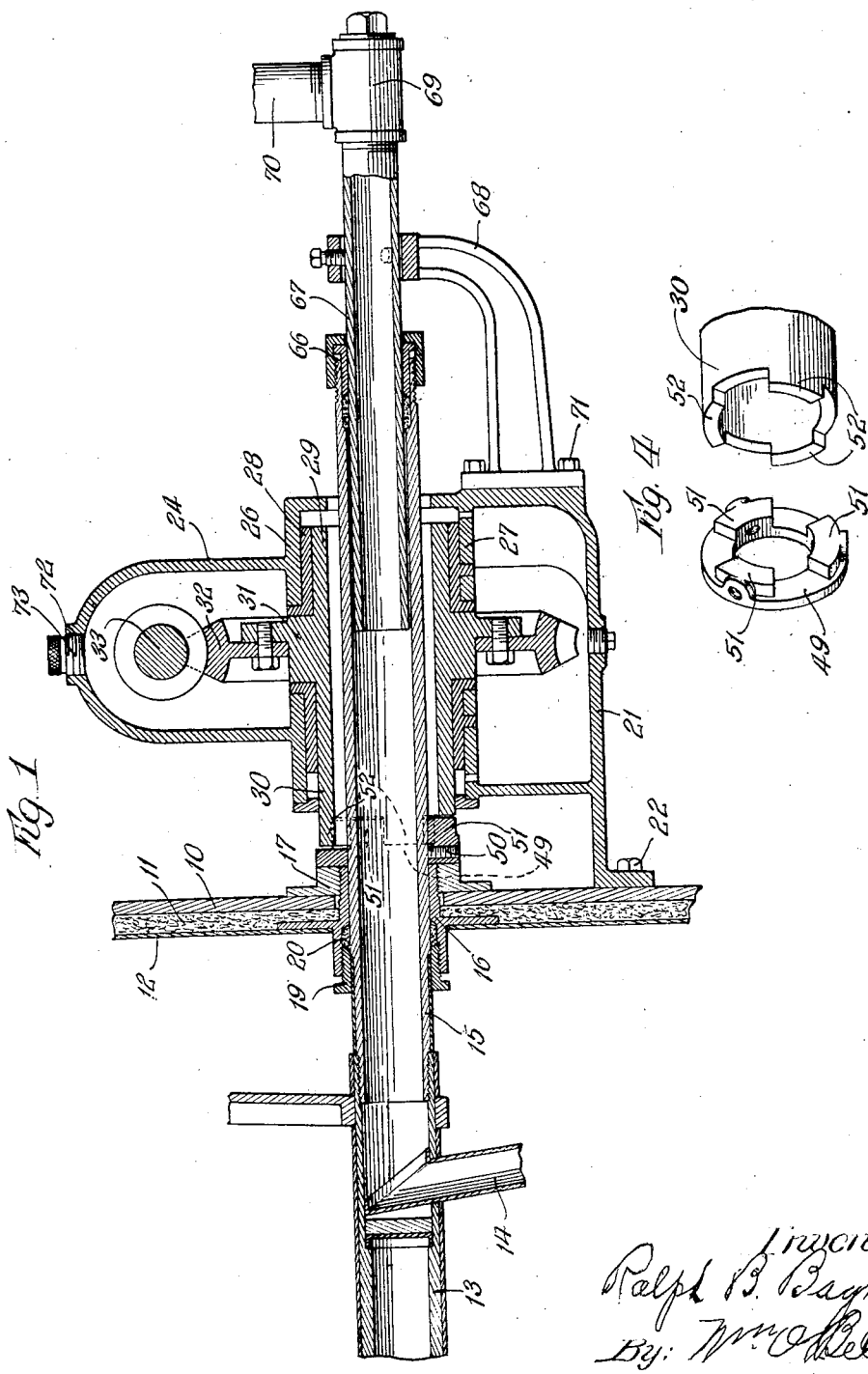

Patented Apr. 10, 1928.

1,665,835

UNITED STATES PATENT OFFICE.

RALPH B. BAGBY, OF CEDAR RAPIDS, IOWA, ASSIGNOR TO J. G. CHERRY COMPANY, OF CEDAR RAPIDS, IOWA, A CORPORATION OF IOWA.

POWER-TRANSMITTING MECHANISM.

Application filed October 5, 1922. Serial No. 592,462.

This invention relates to power transmitting mechanism, shown, by way of example, in the present instance, as applied to apparatus for Pasteurizing, cooling and ripening milk, cream, and the like, and has for its principal object to provide an improved driving mechanism for the heat interchanging coil in which the gearing will be maintained in proper alignment regardless of the wabbling of the coil shaft.

A further object of the invention is to provide a transmission in which the gearing is carried by a rigid support mounted independently of the coil shaft and the drive is communicated to the shaft through a flexible clutch or coupling that leaves the shaft free to wabble without affecting the gearing.

Further objects of the invention will become apparent as the description is read in connection with the accompanying drawings illustrating a selected embodiment of the invention, and in which Fig. 1 is a sectional view of a portion of the heat interchanging coil, the head of the liquid container and the transmission gearing.

Fig. 2 is a view partly in elevation and partly in section taken at right angles to Fig. 1.

Fig. 3 is an exploded view of the flexible clutch or coupling used between the source of power and the transmission gearing, and Fig. 4 is an exploded view of the flexible clutch or coupling between the transmission gearing and the heat interchanging coil shaft.

Referring to the drawings, 10 indicates the outer portion of the head of the container which may be either metal or wood, 11 is a cork or other filler, and 12 is the inner lining. The coil shaft 13 has the coil 14 connected therewith and is screw-threaded to a coil shaft nipple 15 which passes through the head of the receptacle. The coil shaft nipple is preferably journaled in the bearing including the flanged sleeve 16 which is threaded at its outer end to receive the plate 17 and at its inner end to receive the packing gland 19 by which the packing 20 is compressed to make a tight joint with the nipple.

A gear casing 21 is secured to the head of the receptacle by bolts 22 or in any other suitable manner, and is divided on the line 23 to form a removable cover 24 which is secured thereto by bolts 25 (Fig. 2). The casing and the cover are formed with semi-cylindrical bearings 26 and 27 which are suitably lined with babbitt or other bearing metal 28 and receive the tubular portions 29 and 30 of the gear hub 31. The bore of this hub is greater in diameter than the coil shaft nipple 15 and surrounds it with clearance. The hub 31 is equipped with a gear body 32, which meshes with the worm 33 journaled in the cover 24. Preferably the worm is carried by a shaft 34 which is journaled in ball bearings 35 and 36. The inner race of the bearing 36 is clamped between the collar 37 and the nut 38. The inner race of the bearing 35 is forced against the collar 39 by a flanged ringe 40 which telescopes with a double flange ring 41 to communicate the thrust of the worm to the ball bearing 42. The outer flange 43 of the ring 41 lies against the end portion of the cover and is secured thereto by bolts 44 which also hold a closure 45 in place. A similar closure 46 is secured to the opposite end of the cover by bolts 47 and perforated at 48 to form a passage for the end of the shaft 34. A nut 38' secures the ring 40 in place.

From this it will be seen that the transmission gearing is mounted in a rigid casing and is supported independently of the coil shaft nipple. Preferably the casing forms a closure for the gearing, but many of the advantages of the invention can be obtained by substituting a suitable frame for the casing shown. With the gearing arranged in this way and the drive communicated to and from it through suitable flexible couplings or clutches there is no trouble with gears getting out of alignment or otherwise shifting so as to give improper contact.

On account of the deflection of the coil shaft 13 and the flexibility of the bearing in the head of the machine, the coil shaft and the coil shaft nipple do not rotate about their axis, but wabble slightly. To take care of this, I provide a flexible clutch or coupling best illustrated in Fig. 4. The collar 49 is secured on the coil shaft nipple by set screws 50 or other suitable fasteners and presents two or more teeth 51 for engagement with the similar teeth 52 on the end 30 of the worm gear hub. The hub being properly supported in its bearing in the casing, and revolving about the coil shaft nipple 15 with ample clearance will communicate the driving force to the collar 49, regardless of any wabbling of the coil shaft nipple, and without in any way straining or otherwise affecting the operation of the transmission gearing.

The driving power may be received from any suitable source and for illustration I have shown a motor 53 (Fig. 2) having a shaft 54 connected to the shaft 34 by a flexible clutch or coupling best illustrated in Fig. 3. Two L-shaped collars 56 and 57 are keyed or otherwise secured to the respective shafts 54 and 34 and have, in their adjacent faces, grooves 58 and 59 to receive complemental ribs 60 on an intermediate disc 62. This coupling will permit the driving shaft 54 to wabble without in any way straining or otherwise affecting the operation of the shaft 34 and the gearing.

The free end of the coil shaft nipple (Fig. 1) is equipped with a suitable stuffing box 66 which receives a pipe 67 supported by the bracket 68 and connected by an elbow 69 with a supply pipe 70 for heating or cooling liquid. The bracket 68 is conveniently secured to the gear casing 21 by bolts 71.

The cover 24 may be equipped with an opening 72 closed by a plug 73 to facilitate oiling or greasing the gearing.

From the foregoing it will be clear that I have provided a novel construction that will maintain the transmission gearing in proper alignment and transmit the driving power from the driving shaft or other source to the coil shaft efficiently and smoothly. The gearing being supported in a casing or frame entirely independent of the driving shaft or the coil shaft, it is not affected by the movement of these shafts and will remain in proper alignment and relation. The flexible clutches or couplings described are preferred, but other forms may be used if desired.

I am aware that changes may be made in the form, construction and arrangement of the invention, as set forth in the selected embodiment herein, without departing from the scope or sacrificing any of its material advantages, and I therefore reserve the right to make all such changes as fairly fall within the scope of the following claims.

I claim:

1. In combination, a coil shaft free to wabble, a frame, a hub supported in the frame, a worm gear fixed to said hub, a nipple extending through said hub and connected to said coil shaft, means for supporting said nipple independently of said hub, a worm communicating with said worm gear and mounted independently thereof, a motor, flexible means connecting the motor and the worm, and means arranged on said hub and said nipple for rotating said coil shaft, whereby any wabbling motion of the coil shaft will not be transmitted to the worm, gear or said other shafts.

2. In combination, a coil shaft free to wabble, a frame, a hub having a central opening therethrough supported in said frame, a worm gear fixed to said hub, a nipple connected to said coil shaft and extending through said opening, means for supporting the nipple independently of said hub, a worm mounted independently of said worm gear and said nipple for operating said worm gear, a driven shaft, a flexible coupling between said driven shaft and said worm, and means including toothed members fixed to said hub and to said nipple to rotate said coil shaft whereby any wabbling movement of the coil shaft is prevented from being transmitted to said gear, worm or drive shaft.

3. In combination, a hollow coil shaft free to wabble and adapted to have a fluid flow therethrough, a frame, a hub mounted in said frame, a hollow nipple extending through said frame and connected to said coil shaft, a worm gear fixed to said hub, a worm mounted independently of said worm gear to drive the same, a bracket connected to the frame, a pipe line connected to a fluid supply and supported by said bracket and communicating with said nipple, a driving shaft, a flexible coupling connecting said driving shaft and said worm, and flexible means connected to said hub and to said nipple for preventing any wabbling of the coil shaft from being transmitted to the gear worm or driving shaft.

RALPH B. BAGBY.